United States Patent
Derby, V et al.

(10) Patent No.: US 6,904,740 B2
(45) Date of Patent: Jun. 14, 2005

(54) ARTICULATING HANDLE FOR A WALK-BEHIND MOWER

(75) Inventors: Harry L. Derby, V, Charlotte, NC (US); Jeffrey A. Millard, Fort Mill, SC (US); Carlos A. Bellot, Charlotte, NC (US)

(73) Assignee: Textron Inc., Providence, RI (US)

( * ) Notice: Subject to any disclaimer, the term of this patent is extended or adjusted under 35 U.S.C. 154(b) by 2 days.

(21) Appl. No.: 10/364,778

(22) Filed: Feb. 11, 2003

(65) Prior Publication Data

US 2004/0154275 A1 Aug. 12, 2004

(51) Int. Cl.⁷ .............................................. A01D 69/02
(52) U.S. Cl. ...................................................... 56/10.5
(58) Field of Search ............................. 56/11.3, 11.6, 56/10.5; 125/13.01, 13.03, 15, 16.03; 192/84.96; 477/171–173, 179

(56) References Cited

U.S. PATENT DOCUMENTS

| | | | |
|---|---|---|---|
| 3,581,480 A | 6/1971 | O'Connor | |
| 3,841,069 A | 10/1974 | Weck | |
| 3,946,543 A | 3/1976 | Templeton | |
| 4,117,651 A | 10/1978 | Martin, Jr. | |
| 4,322,934 A | 4/1982 | Doi | |
| 4,354,149 A | 10/1982 | Armond et al. | |
| 4,440,277 A | * 4/1984 | Thomson | 192/12 D |
| 4,558,558 A | * 12/1985 | Horner et al. | 56/11.3 |
| 4,835,409 A | 5/1989 | Bhagwat et al. | |
| 4,854,540 A | 8/1989 | Balek | |
| 4,928,458 A | 5/1990 | Yoshiaki et al. | |
| 4,995,227 A | 2/1991 | Foster | |
| 5,394,678 A | 3/1995 | Lonn | |
| 5,402,626 A | 4/1995 | Zinck | |
| 5,442,901 A | 8/1995 | Niemela et al. | |
| 5,490,370 A | 2/1996 | McNair | |
| 5,509,258 A | 4/1996 | Swenson et al. | |
| 5,606,851 A | 3/1997 | Bruener | |
| 5,727,372 A | 3/1998 | Kanitz et al. | |
| 5,909,064 A | 6/1999 | Feil et al. | |
| 5,937,622 A | 8/1999 | Carrier et al. | |
| 6,047,786 A | 4/2000 | Stevenson et al. | |
| 6,102,022 A | * 8/2000 | Schave | 125/13.01 |
| 6,125,621 A | 10/2000 | Burch | |
| 6,170,241 B1 | 1/2001 | Shibilski et al. | |

FOREIGN PATENT DOCUMENTS

| | | |
|---|---|---|
| DE | 35 00 591 A | 7/1986 |
| EP | 0 393 907 A | 10/1990 |
| WO | WO 97/28681 | 8/1997 |

* cited by examiner

Primary Examiner—Robert E Pezzuto
(74) Attorney, Agent, or Firm—Harness, Dickey & Pierce, P.L.C.

(57) ABSTRACT

A walk-behind greensmower includes an operator presence control for selectively determining when power from a source is delivered to an output. The operator presence control includes a handle, a bale coupled to the handle, a control arm and an electromagnet. The bale is moveable between an engaged position and a disengaged position. The control arm is moveable between a neutral position and a drive position where the control arm causes delivery of power from the source to the output when in the drive position. The electromagnet is selectively energizable in response to the position of the bale such that the control arm is retained in the drive position when the bale is in the engaged position.

6 Claims, 6 Drawing Sheets

US 6,904,740 B2

ARTICULATING HANDLE FOR A WALK-BEHIND MOWER

FIELD OF THE INVENTION

The present invention relates to a walk-behind greensmower and, more particularly, to an articulating handle and control system for a walk-behind greensmower.

BACKGROUND OF THE INVENTION

Walk-behind reel mowers and rotary mowers have been provided with operator presence features in the past. Typically, the mower is provided with a lever called a bale which may be moved between a disengaged and engaged positions. When the operator moves the lever to its engaged position, the traction mechanism, the blade or both are driven. If the operator releases the bale, the blade and/or traction mechanism are stopped.

While the existing operator presence control mechanisms may operate sufficiently, it is desirable to provide a walk-behind reel mower with an operator presence control having a reduced number of components, simplified operation and improved reliability.

SUMMARY OF THE INVENTION

A walk-behind greensmower includes an operator presence control for selectively determining when power from a source is delivered to an output. The operator presence control includes a handle, a bale coupled to the handle, a control arm and an electromagnet. The bale is moveable between an engaged position and a disengaged position. The control arm is moveable between a neutral position and a drive position where the control arm causes delivery of power from the source to the output when in the drive position. The electromagnet is selectively energizable in response to the position of the bale such that the control arm is retained in the drive position when the bale is in the engaged position.

Another embodiment of the present invention includes a tilt mechanism pivotally interconnecting a handle and a support. The tilt mechanism is operable to selectively fix the position of a handle relative to the support at a desired angle.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
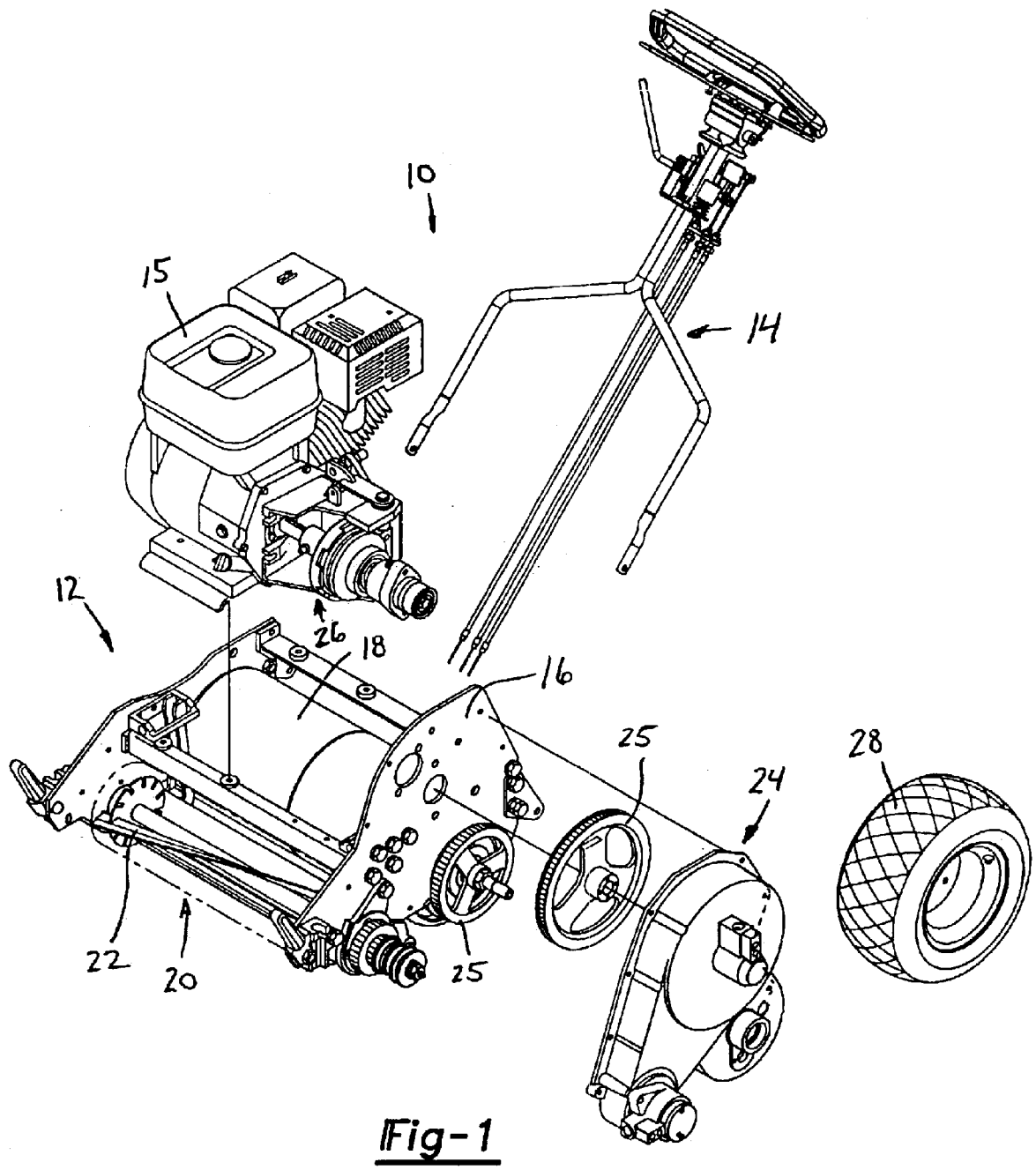
FIG. 1 is an exploded perspective view of a walk-behind reel mower constructed in accordance with the teachings of the present invention.

Referring to FIG. 1, a walk-behind reel mower constructed in accordance with the teachings of the present invention is depicted at reference numeral 10. Mower 10 includes a cutting unit 12 and an operator control assembly 14. Cutting unit 12 includes a power source or engine 15 coupled to a frame 16. A traction roller 18 is rotatably coupled to frame 16 and drivingly connected to engine 15. A reel 20 includes a plurality of blades 22 rotatably mounted to frame 16. Reel 20 is selectively driven by engine 15. A transmission 24 includes a plurality of sprockets 25 selectively transferring rotational output torque of engine 15 to traction roller 18 and/or reel 20. Transmission 24 includes a clutch 26 positioned intermediate engine 15 and transmission 24. Clutch 26 is operable in an engaged mode and a disengaged mode for selectively transferring power from engine 15 to traction roller 18 and reel 20. Wheels 28 are coupled to traction roller 18 and are also selectively driven by engine 15 to provide motive force for translating walk-behind greensmower 10 along the ground. It should be appreciated that while the operator control assembly of the present invention is shown in conjunction with a walk-behind greensmower powered by an internal combustion engine, other devices are contemplated. For example, any walk-behind device such as a blower, string trimmer or mower may incorporate the operator control assembly of the present invention. Furthermore, these devices may utilize electric motors, hybrid power sources or the like.

Figure 2:
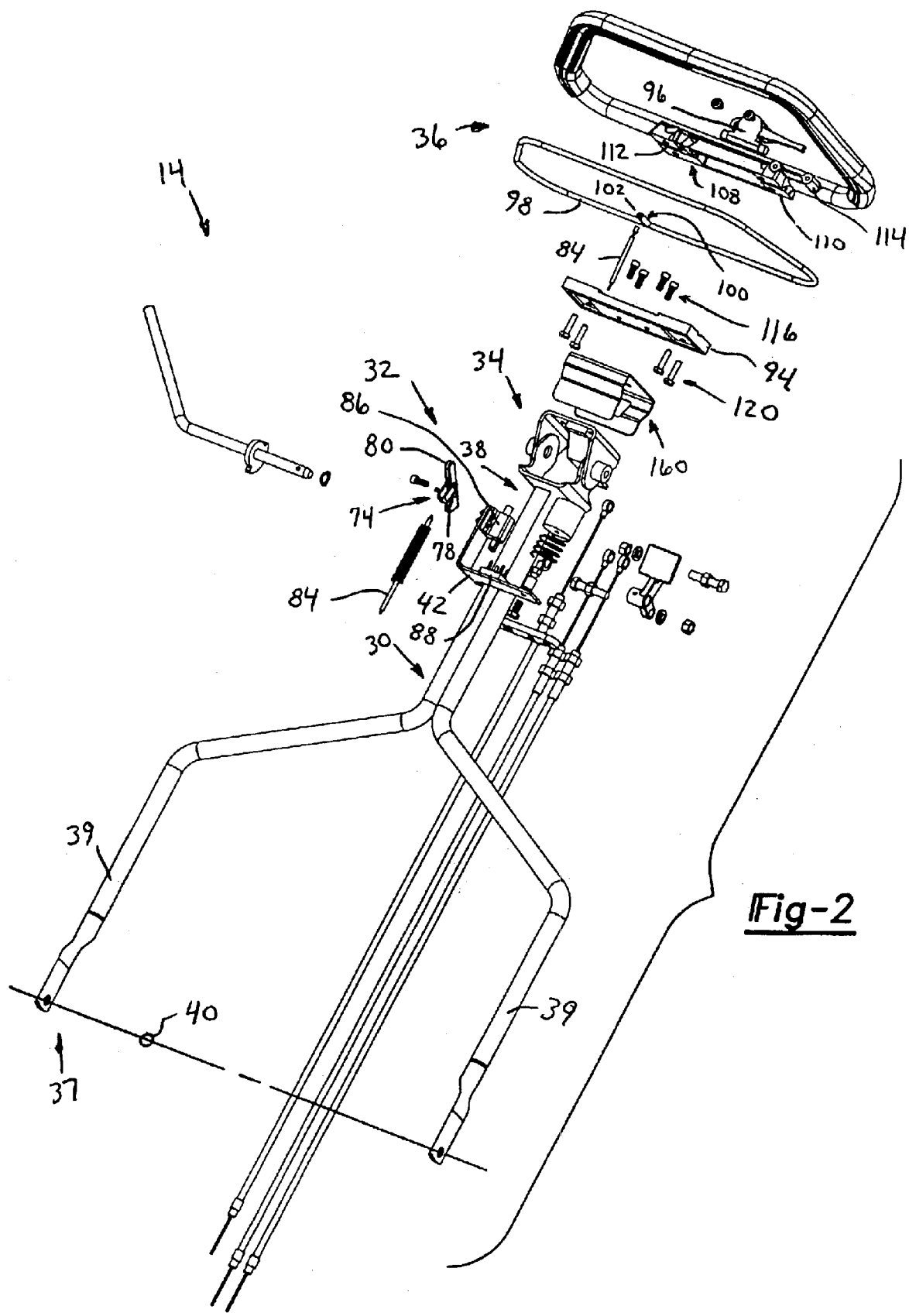
FIG. 2 is an exploded perspective view of an operator control assembly of the walk-behind greensmower of the present invention.
Figure 3:
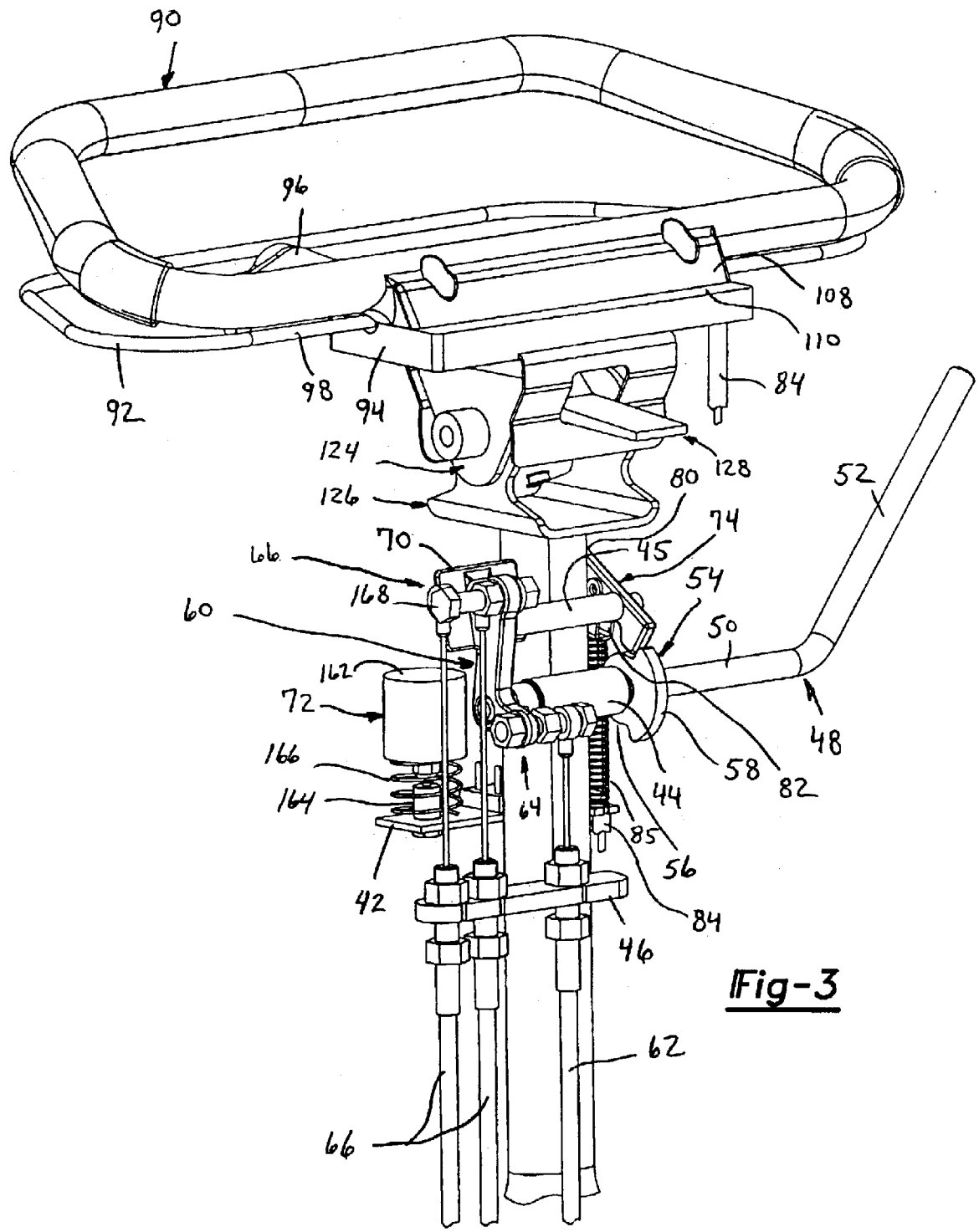
FIG. 3 is a partial perspective view of the operator control assembly of the walk-behind greensmower of the present invention.

With reference to FIGS. 2 and 3, operator control assembly 14 includes a support arm 30, an actuation assembly 32, a tilt mechanism 34 and a handle assembly 36. Support arm 30 provides a substantially rigid structure for supporting actuation assembly 32 and tilt mechanism 34. Support arm 30 interconnects handle assembly 36 and frame 16 to allow an operator to control the direction of movement of mower 10. Support arm 30 includes a first end 37 and a second end 38. First end 37 includes a pair of bifurcated tubular legs 39 pivotally coupled to frame 16. The pivotal interconnection allows a user to rotate the entire operator control assembly about a pivot axis 40 to account for variation in operator stature. Second end 38 provides a rigid mount for tilt mechanism 34. A support bracket 42 is coupled to support arm 30 intermediate first end 37 and second end 38. Support bracket 42 provides mounting locations for a variety of components of actuation assembly 32. A guide sleeve 44, a pivot pin 45, and a cable bracket 46 are also coupled to support arm 30 to provide a mount for components of actuation assembly 32.

Actuation assembly 32 includes a control arm 48 selectively positionable in a neutral position (shown in FIG. 2), a drive position and a brake position. Control arm 48 provides an operator a single interface for engaging and disengaging clutch 26 as well as for applying or releasing the brakes (not shown). Control arm 48 includes a substantially cylindrical first portion 50 and a substantially cylindrical second portion 52. A cam 54 is fixed to first portion 50. Cam 54 includes a lower lobe 56 and an upper lobe 58. First portion 50 is rotatably supported within guide sleeve 44. A cable link 60 is coupled to an end of control arm 48 such that guide sleeve 44 is trapped between cable link 60 and cam 54 to limit axial movement of control arm 48. A clutch cable 62 is coupled to first end 64 of cable link 60. A pair of brake cables 66 is pivotally coupled to a second end 68 of cable link 60. Cable link 60 also includes a paddle 70 for engagement with an electromagnet 72, as will be described in greater detail hereinafter.

A pawl 74 is pivotally coupled to pivot pin 45. Pawl 74 is selectively positionable in an engaged position as shown in FIG. 3, and a disengaged position where pawl 74 does not contact cam 54. Pawl 74 includes a head 78 selectively engageable with cam 54 and a finger 80 positioned distally from head 78. A yoke 82 is pivotally coupled to pawl 74 and is configured to mount one end of a control cable 84 thereto. A spring 85 partially surrounds control cable 84 and loads pawl 74 to bias head 78 into engagement with cam 54.

A micro-switch 86 is mounted to support bracket 42 and is selectively actuated by finger 80 of pawl 74. Micro-switch 86 is normally open and in electrical communication with a rectifier 88 and electromagnet 72. During operation, rectifier 88 accepts an alternating current signal from engine 15 and converts the alternating current signal into a direct current input to micro-switch 86. When finger 80 contacts micro-switch 86, the circuit is closed to supply a DC signal to electromagnet 72.

Handle assembly 36 includes a handle 90, a bale 92, a tilt plate 94 and a throttle control 96. Bale 92 is pivotally coupled to handle 90 to provide an operator presence control. Bale 92 is rotatable from a disengaged position shown in FIG. 3 to a rearward engaged position where bale 92 contacts handle 90. Bale 92 is a substantially closed loop wire-form having a substantially cylindrical base leg 98. A stop 100 is rigidly coupled to base leg 98 and inwardly protrudes therefrom. Stop 100 includes a detent 102 for receipt of the opposite end of control cable 84. Spring 85 provides a biasing force on control cable 84 such that bale 92 is biased to the disengaged position.

Figure 4:
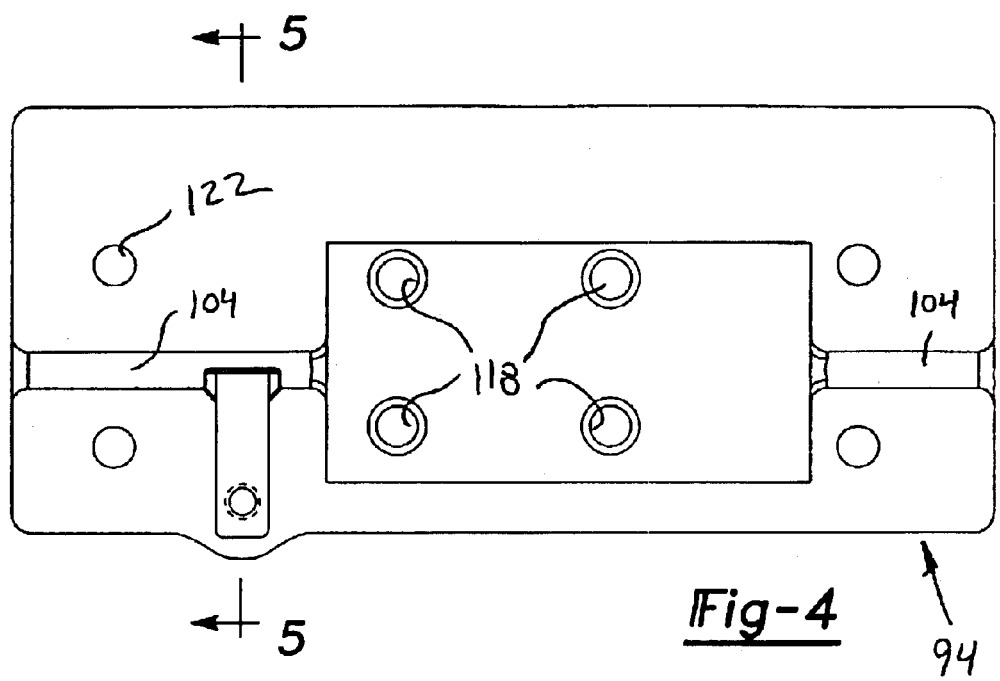
FIG. 4 is a plan view of a tilt plate of the present invention.
Figure 5:
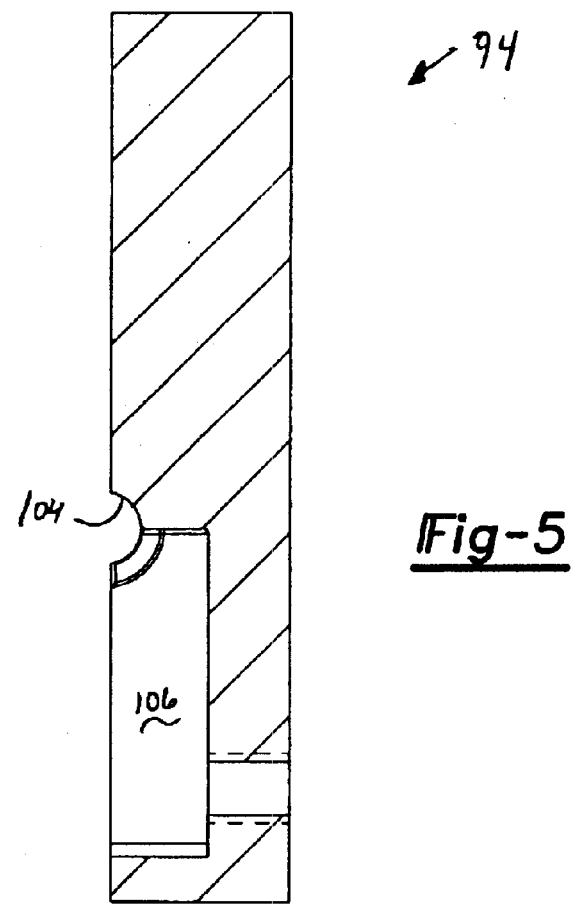
FIG. 5 is a cross-sectional view as taken along line 5—5 of FIG. 4.

As shown in FIGS. 4 and 5, tilt plate 94 includes a journal 104 to rotatably support base leg 98. Tilt plate 94 also includes a pocket 106 for receipt of stop 100. The articulation angle of bale 92 toward the disengaged position is limited by the size of pocket 106. Specifically, stop 100 contacts tilt plate 94 after it has rotated through the clearance provided by pocket 106.

Handle 90 includes an integrally molded base 108. Base 108 includes a mounting surface 110, journals 112 and bosses 114. Journals 112 cooperate with journal 104 of tilt plate 94 to capture base leg 98 of bale 92 while providing rotational freedom to the bale.

Threaded fasteners 116 extend through apertures 118 of tilt plate 94 to couple tilt mechanism 34 to base 108 of handle 90. Additional fasteners 120 extend through apertures 122 of tilt plate 94 to couple the tilt plate to base 108. Throttle control 96 is mounted to bosses 114 to provide a conveniently located adjustable throttle adjacent the operator's hands.

Figure 6:
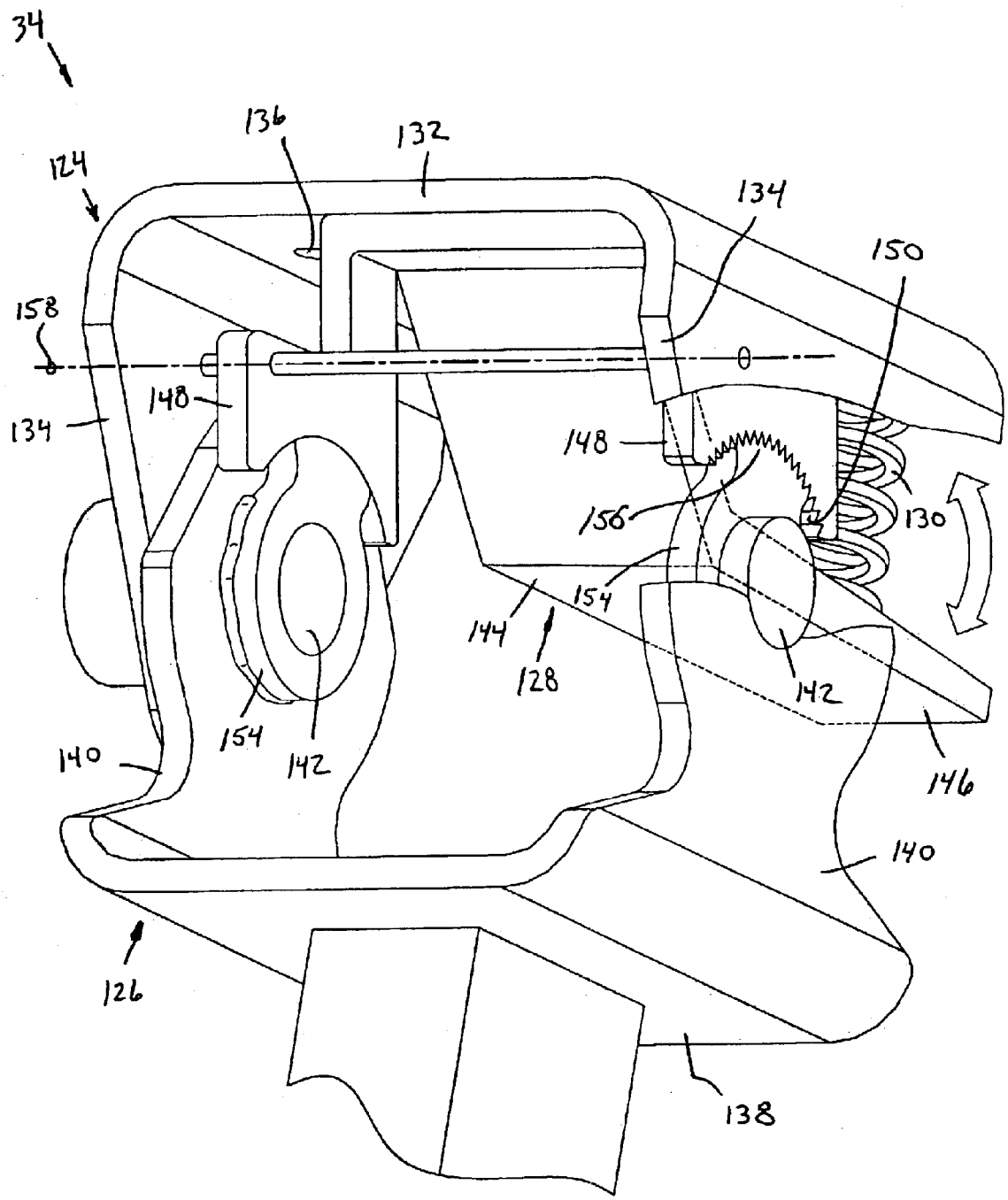
FIG. 6 is a partial perspective view of a tilt mechanism of the present invention.

With reference to FIG. 6, tilt mechanism 34 includes an upper bracket 124 pivotally coupled to a lower bracket 126. A lever 128 is pivotally coupled to upper bracket 124 and is rotatable to selectively place tilt mechanism 34 in a locked or unlocked mode. A spring 130 biases lever 128 toward a first position corresponding to the locked mode. Upper bracket 124 is a substantially "C" shaped member having a base 132 and a pair of side walls 134. Base 132 includes a plurality of apertures 136 extending therethrough for receipt of fasteners 116.

Lower bracket 126 is also a substantially "C" shaped member having a base 138 and a pair of side walls 140. Each of side walls 134 and 140 includes an aperture for receipt of a pin 142 to pivotally interconnect upper bracket 124 to lower bracket 126.

Lever 128 includes a body 144, a tang 146 and a pair of vertical supports 148 downwardly extending from body 144. Tang 146 extends outwardly beyond the upper and lower brackets to provide a surface which may be easily grasped by an operator. A plurality of teeth 150 are positioned at an end of at least one of vertical supports 148. A pair of reinforcing plates 154 is coupled to an inner surface of side walls 140 of lower bracket 126. A plurality of teeth 156 are positioned on the distal end of at least one of reinforcing plates 154. Teeth 156 are normally positioned in meshing engagement with teeth 150 due to the biasing force supplied by spring 130. When the two sets of teeth are engaged, the angular position of handle 90 is fixed. If an operator wishes to tilt handle 90, lever 128 is rotated about an axis 158 to disengage teeth 150 from teeth 156. Once the teeth are disengaged, the operator may rotate handle 90 to a desired position. By providing this adjustment feature, operator fatigue and discomfort should be minimized. A shroud 160 (FIG. 2) is placed over upper bracket 124 and lever 128 to limit ingress of contaminants and operator appendages within the area defined between upper bracket 124 and lower bracket 126.

In operation, engine 15 is started and an electrical AC signal is supplied to rectifier 88. Rectifier 88 converts the AC signal into a DC signal which is supplied to micro-switch 86. Micro-switch 86 is normally open and current is not supplied to electromagnet 72 at this time. If an operator wishes to drive traction roller 18 and/or reel assembly 20, bale 92 is rotated rearwardly to the engaged position. Rotation of bale 92 causes stop 100 to rotate and impart tension to control cable 84. Control cable 84 causes pawl 74 to rotate thereby disengaging head 78 from lower lobe 56 of cam 54. As pawl 74 is rotated, finger 80 closes micro-switch 86 to provide a DC signal to electromagnet 72.

At this time, control arm 48 is rotated toward cutting unit 12. Paddle 70 engages an upper surface 162 of electromagnet 72 thereby limiting the maximum rotation of control arm 48. A coupling 164 pivotally interconnects electromagnet 72 and support bracket 42. A spring 166 positions electromagnet 72 in a substantially vertical orientation. However, spring 166 also allows electromagnet 72 to move via coupling 164 when paddle 70 comes into contact with surface 162 thereby providing optimum alignment between the paddle and the electromagnet. During rotation of control arm 48, a tensioning force is imparted to clutch cable 62. Clutch 26 is shifted to its engaged mode where drive torque is supplied from engine 15 to traction roller 18 and reel assembly 20.

Because electromagnet 72 is energized and paddle 70 is constructed from a ferro-magnetic material, control arm 48 is retained in a position to engage clutch 26. Clutch cable 62 is biasedly loaded in a direction to urge control arm 48 to the neutral position but the torque generated by electromagnet 72 and paddle 70 is greater than the torque provided by clutch cable 62. Therefore, the operator need not continue applying force to control arm 48 once clutch 26 is engaged.

The operator presence control functions to discontinue the supply of power from engine 15 to traction roller 18 and reel assembly 20 if bale 92 is released. When bale 92 is released, spring 85 urges pawl 74 to rotate. During rotation of pawl 74, head 78 engages upper lobe 58 of cam 54 and finger 80 becomes spaced apart from micro-switch 86. Micro-switch 86 opens and discontinues supply of power to electromagnet 72. Once electromagnet 72 is shut off, cable link 60, cam 54 and control arm 48 rotate away from cutting unit 12 toward the neutral position due to the return spring load provided by clutch cable 62. Control arm 48 tends to remain in the neutral position because at least one of brake cables 66 also includes a return spring counteracting the clutch cable return spring load. Once control arm 48 is rotated to the neutral position, head 78 of pawl 74 engaged lower lobe 56 of cam 54 to provide a lock-out feature. When bale 92 is in the disengaged position, control arm 48 is locked-out from rotating toward cutting unit 12 by head 78. In this manner, traction roller 18 and reel assembly 20 may not be actuated without an operator present to maintain bale 92 in its engaged position.

Braking may be accomplished by rotating control arm 48 away from cutting unit 12. One skilled in the art will appreciate that bale 92 need not be rotated into the engaged position to actuate the brakes. As control arm 48 is rotated, cable link 60 imparts a tensile force to brake cables 66, thereby actuating the brakes. Furthermore, cable link 60 may continue to be rotated such that an attachment pin 168 of brake cables 66 is moved to an over-center position, thereby providing a parking brake function. The range of motion in the over-center direction is limited by paddle 70 contacting pivot pin 45. When in the over-center position, both brakes remain applied after the force to control arm 48 has been removed. The brakes may be released by simply rotating control arm 48 to the neutral position.

Figure 7:
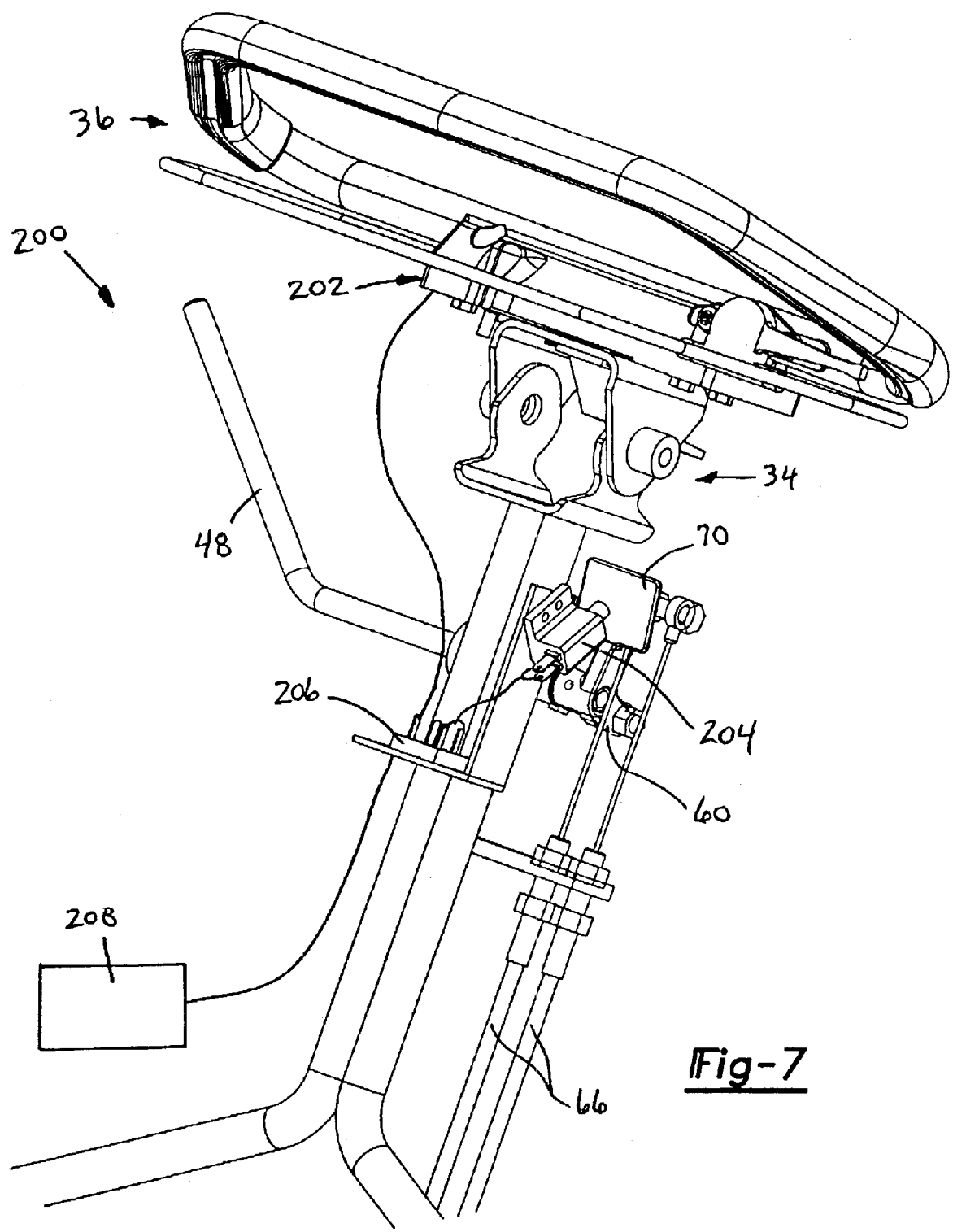
FIG. 7 is a perspective view depicting an alternative embodiment operator control assembly constructed in accordance with the teaching of the present invention.

FIG. 7 depicts an alternate operator control assembly 200 including a first micro-switch 202, a second micro-switch 204, a relay 206 and an electromagnetic clutch 208. The micro-switches and electromagnetic clutch are used in lieu of the previously described clutch, control cable assembly and electromagnet. Specifically, first micro-switch 202 is normally open and is closed upon movement of bale 92 to the engaged position. Once first micro-switch 202 is closed, current is supplied to relay 206. When control arm 48 is rotated toward cutting unit 12, cable link 60 contacts second micro-switch 204 in a momentary fashion to latch relay 206. The latching of relay 206 causes current to flow to electromagnetic clutch 208 when first micro-switch 202 is closed, thereby placing electromagnetic clutch 208 in an engaged mode. Electromagnetic clutch 208 is maintained in the engaged mode as long as bale 92 is positioned in the engaged position and first micro-switch 202 is closed. If bale 92 is released to the disengaged position, first micro-switch 202 opens and discontinues the supply of current to electromagnetic clutch 208 thereby de-coupling engine 15 and traction roller 18.

Furthermore, the foregoing discussion discloses and describes merely exemplary embodiments of the present invention. One skilled in the art will readily recognize from such discussion, and from the accompanying drawings and claims, that various changes, modifications and variations may be made therein without department from the spirit and scope of the invention as defined in the following claims.

What is claimed is:

1. An operator presence control for selectively determining when power from a source is delivered to an output, the operator presence control comprising:
    a handle;
    a bale coupled to the handle and moveable between an engaged position and a disengaged position;
    a control arm moveable between a neutral position and a drive position, the control arm adapted to cause delivery of power from the source to the output when in the drive position and interrupt power delivery when in the neutral position; and
    an electromagnet selectively energizable in response to the position of the bale, the control arm being electromagnetically retained in the drive position while the bale is in the engaged position.

2. The operator presence control of claim 1 wherein the control arm is released from the drive position and biased toward the neutral position when the electromagnet is de-energized due to the bale being in the disengaged position.

3. The operator presence control of claim 1 further including a rectifier for converting an alternating current to an direct current, the direct current being selectively supplied to the electromagnet.

4. The operator presence control of claim 1 further including a link coupled to the control arm for selectively tensioning a cable adapted to cause delivery of power from the source to the output.

5. The operator presence control of claim 1 wherein the control arm is moveable to a brake position and wherein the control arm is adapted to cause application of a brake.

6. The operator presence control of claim 5 further including a link coupled to the control arm for selectively tensioning a cable adapted to cause application of the brake.

* * * * *